Patented May 1, 1928.

1,667,767

UNITED STATES PATENT OFFICE.

HERMANN BOLLMANN, OF HAMBURG, GERMANY, ASSIGNOR, BY MESNE ASSIGNMENTS, TO MARY FULFORD FOSTER, TRUSTEE, OF WASHINGTON. DISTRICT OF COLUMBIA.

PROCESS OF PURIFYING PHOSPHATIDES OBTAINED FROM OILSEEDS AND THE LIKE.

No Drawing. Application filed May 28, 1925, Serial No. 33,559, and in Germany April 14, 1925.

The present invention relates to an improved process of purifying phosphatides obtained from oil-seeds and the like.

In extracting oil-seeds and legumes containing lecithin, for example soy-beans, by means of alcohol and benzol there are obtained besides oil and bitter matters; phosphatides which (after vaporizing the solvent by conveying steam into the same) may be separated from the bulk of the oil. In this manner a mixture is obtained which contains (50 to 57 per cent of) phosphatides besides oil and water. About one half of these phosphatides consists of lecithin whereas the other half is insoluble in alcohol.

The said phosphatides may be purified by treating them with acetone whereby water, oil and other impurities are eliminated and the whole of the phosphatides is obtained in a rather pure state. By subjecting this material to action of alcohol, the whole amount of the phosphatides may then be divided or split up into lecithin and phosphatides insoluble in alcohol. Furthermore by treating the matters insoluble in alcohol with diluted alcohol considerable quantities of the oil and other impurities may be separated.

The subject-matter of the present invention is a process with the aid of which I can separate from one another lecithin and phosphatides insoluble in alcohol in a comparatively simple manner, and can obtain them in a pure state.

For carrying the improved process into practice, the above mentioned mixture consisting of the whole of the phosphatides, oil, water and other impurities is agitated for example with three times its bulk of alcohol of 96 vol. per cent while heating the said alcohol and said mixture up to about 60° C. until the constituent parts are completely dissolved. This solution is then cooled down to about 45° C. and kept at this temperature. Considerable quantities of neutral oil, free fatty acids and other impurities will then be deposited which are subsequently separated.

After this the temperature is reduced to about 35° C. Now the existing small remainder of neutral oil and also the bulk or main part of the phosphatides insoluble in alcohol at this temperature, are deposited and removed. This deposit, after the evaporation of a portion of the alcohol forms a body of light color. By cooling the remaining solution down to about 25° C. the remainder of the phosphatides insoluble in alcohol is precipitated and removed. The finally remaining alcoholic solution is then evaporated or concentrated under reduced air pressure at a low temperature. The residue consists of very pure lecithin.

The neutral oil may also be largely removed from its mixture with the phosphatides, by diluting the warm alcoholic solution with water and by subsequently cooling it to about 50° C. After the oil has been removed or separated the remaining solution is further treated in the manner above described.

Furthermore it has proved to be very advantageous, to treat the warm alcoholic solution containing the phosphatides, oil, water and other impurities in the first place with animal charcoal or other decoloring-powder, and afterwards to perform the separation by fractional cooling, as above set forth. In this manner exceptionally light-colored products are obtained.

I claim:

1. A process of obtaining partially purified phosphatides obtained from oil-seeds and the like, which comprises dissolving a mixture consisting essentially of the said phosphatides, oil, water and other impurities, in about three volumes of strong alcohol while agitating and heating to about 60° C., thereafter separating the single constituent parts from this solution by cooling to successively lower temperatures, and finally evaporating the remaining solution under pressure below atmospheric, at a low temperature.

2. Process of partially purifying and separating phosphatides obtained from oil-seeds and the like, which comprises dissolving the mixture consisting essentially of the said phosphatides (including lecithin), oil, water and other impurities in strong alcohol while heating to about 60° C., thereafter reducing the temperature of the solution to about 45° C., whereby neutral oil, free fatty acids and other impurities are separated, and further cooling the solution down to about 35° C. in order to precipitate the remainder of the neutral oil and the main part of the phosphatides insoluble in alcohol, cooling further to about 25° C., to separate the remainder of the said phosphatides insoluble in alcohol, and finally evaporating off the solvent to leave pure lecithin.

3. A process of partially purifying phosphatides obtained from oil-seeds and the like, which comprises dissolving a mixture consisting essentially of the phosphatides, oil, water and other impurities in strong alcohol while at about 60° C., diluting with water and cooling down to about 50° C., removing the separated oil, subjecting the remaining solution to successive cooling at successively lower temperatures, and finally evaporating the solvent from the remaining solution at below atmospheric pressure, at a low temperature, whereby the lecithin is left in a substantially pure state.

In testimony whereof I affix my signature.

HERMANN BOLLMANN.